Dec. 29, 1953   S. BETANCOURT CANO ET AL   2,664,101
AUTOMATIC SHUTOFF VALVE FOR PRESSURE FLUID SYSTEMS
Filed Nov. 29, 1950
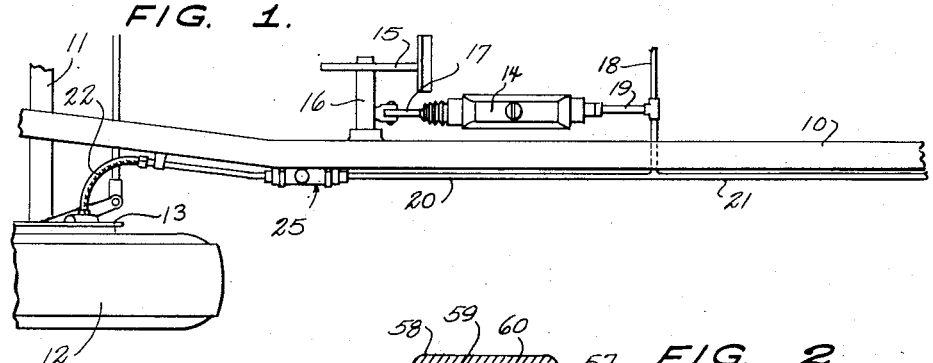
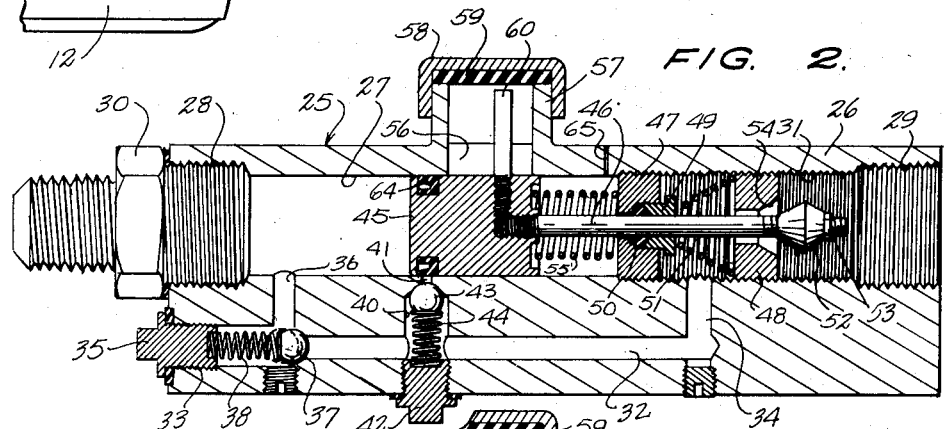
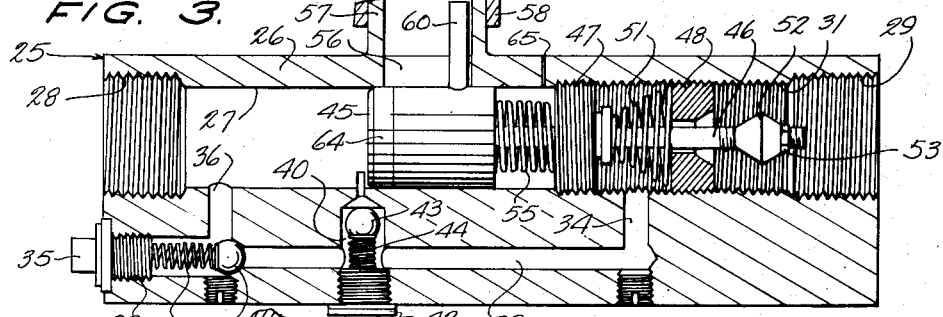
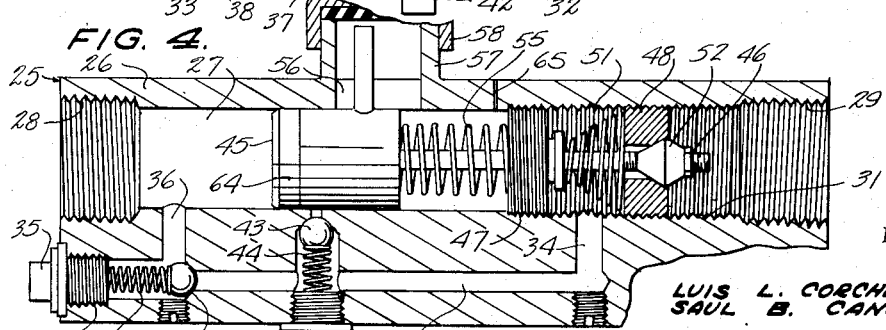
INVENTORS.
LUIS L. CORCHERO,
SAUL B. CANO,
BY
McMorrow, Berman + Davidson
ATTORNEYS Patented Dec. 29, 1953

2,664,101

UNITED STATES PATENT OFFICE 2,664,101

AUTOMATIC SHUTOFF VALVE FOR PRESSURE FLUID SYSTEMS

Saúl Betancourt Cano and Luis Lara Corchero, Havana, Cuba

Application November 29, 1950, Serial No. 198,095

1 Claim. (Cl. 137—460)

This invention relates to automatic shut-off valves for pressure fluid systems, and more particularly to an automatic shut-off valve for a hydraulic system, such as a hydraulic vehicle brake system, to prevent loss of the hydraulic fluid in the event of leakage in the system or rupturing of one or more parts of the system.

It is among the objects of the invention to provide an improved automatic shut-off valve which can be coupled into a pressure fluid system at the outlet side of the source of fluid under pressure to prevent loss of fluid from the system in the event of damage to the system at the side of the shut-off valve remote from the source of fluid under pressure; which can be connected in multiple into a vehicle hydraulic brake system and disposed one adjacent each of the wheel brakes to prevent loss of hydraulic fluid from the system or loss of braking effect on the other wheels of the vehicle in the event one of the wheel brakes or the line leading from the corresponding shut-off valve thereto becomes defective or damaged resulting in loss of fluid pressure at the particular wheel brakes; which does not interfere in any way with the application of fluid to or release fluid from any wheel brake as long as the corresponding portion of the hydraulic system is intact, nor interfere in any way with the normal operation of the brakes; which is of light weight and small size and can be easily connected into a hydraulic line or conduit; which is easy to reset after it has been operated and the hydraulic system subsequently repaired; and which is simple and durable in construction, economical to manufacture, easy to install, and positive and effective in operation.

Other objects and advantages will become apparent from a consideration of the following description and the appended claim in conjunction with the accompanying drawing, wherein:

Figure 1 is a fragmentary top elevational view of an automotive vehicle chassis showing a fragmentary portion of a hydraulic brake system and an automatic shut-off valve illustrative of the invention operatively connected into the brake system;

Figure 2 is a longitudinal cross-sectional view of the automatic shut-off valve;

Figure 3 is a view similar to Figure 2, showing the parts in a different operative position to that illustrated in Figure 2; and Figure 4 is a view similar to Figures 2 and 3, but showing the parts in a still different operative position from that illustrated in Figures 2 and 3.

With continued reference to the drawing, the vehicle, fragmentarily illustrated, has a frame, including a side frame member 10, the frame being carried at its front end on a front axle 11 or other suitable support carried by the front wheels of the vehicle, one of which is indicated at 12. It is to be understood that there are at least four wheels supporting the vehicle frame, and that each wheel is equipped with a brake, as indicated at 13 for the wheel 12.

The hydraulic brake system includes a brake master cylinder 14 suitably mounted on the vehicle frame, a brake foot pedal 15 pivotally mounted on the frame by a suitable support 16 and connected to the piston in the master cylinder 14 by a suitable piston or connecting rod 17 and conduits connecting the master cylinder 14 at its outlet end to the several wheel brakes. In the arrangement illustrated, the conduit system includes a cross conduit 18 which extends transversely of the vehicle and to which the master cylinder 14 is connected by a conduit 19, and conduits, as indicated at 20 and 21, leading two from each end of the cross conduit 18 to the front wheel and rear wheel brakes, respectively, at the corresponding side of the vehicle.

The vehicle brakes include brake cylinders and pistons or cups of a form well known to the art, and the conduits 20 and 21 are connected to the corresponding brake cylinders by flexible conduit extensions, as indicated at 22, connecting the conduit 21 to the cylinder of the wheel brake 13.

It occasionally happens that one of the flexible conduit portions, such as the portion 22, on a vehicle becomes worn or broken, the connections between said flexible conduit and the rigid portion of the conduit and the brake cylinder become defective or the brake cylinder or cup itself becomes defective and leaks hydraulic fluid. If the flexible coupling breaks or the connections at the ends thereof pull off, there is, of course, a large immediate loss of fluid from that portion of the system. If one of the wheel brakes becomes defective and loses fluid or one of the flexible couplings or its connections becomes defective and loses fluid, with the present hydraulic brake systems on vehicles, the fluid will be pumped entirely out of the system upon operation of the foot pedal and no pressure can be produced in the system to operate any of the brakes. This results in a complete loss of braking power for the vehicle if one of the wheel brakes fails. It is contemplated that by connecting suitable shut-off valves into the conduits of the hydraulic system, one valve adjacent each wheel brake, if one of the brakes or the conduit portion adjacent thereto should fail, the hydraulic fluid can be automatically cut off from such defective brake and retained in the system so that pressure can be built up in the system and braking effect of the remaining wheels of the vehicle maintained.

Such an automatic shut-off valve is generally indicated at 25 in Figure 1, and is connected into the conduit 20 adjacent the flexible extension or coupling 22 which leads from the conduit 20 to the brake 13 of the front wheel 12. It is to be understood that similar shut-off valves will be interconnected into the corresponding conduits one adjacent each wheel brake of the vehicle, so that the hydraulic system will be protected against failure of any wheel brake of the vehicle.

The automatic cut-off valve 25 is illustrated in detail in Figures 2, 3 and 4, and comprises a valve body 26 of elongated shape which may be formed as a built-up structure of suitable tubular parts, or as a solid block, as illustrated, drilled out to provide the necessary channels, passages and ports therein.

In the arrangement illustrated, the valve body 26 is provided with a bore 27 of circular cross-sectional shape provided at its opposite ends with internal screw-threads, as indicated at 28 and 29, which receive screw-threaded union couplings, as indicated at 30 in Figure 2, by means of which the ends of the conduit, such as the conduit 20, at the opposite ends of the valve are connected to the bore in the valve body at the opposite ends of the bore, it being understood that there will be a complete coupling at each end of the valve body.

Adjacent the screw-threaded portion 29 the bore 27 is provided with additional internal screw-threads 31 which extend inwardly from the inner end of the screw-threaded portion 29 to a location adjacent to but spaced from the midlength location of the valve body, the screw-threads 31 preferably having a somewhat smaller diameter than the screw-threads 28 and 29.

A fluid channel 32 is provided in the valve body 26 extending from the end of the body at which the screw-threads 28 are provided substantially parallel to the bore 27 to a location adjacent to but spaced from the other end of the valve body, the end of the channel 32 adjacent the screw-threads 28 being internally screw-threaded, as indicated at 33, and the other end of this channel being connected by passage 34 extending transversely of the corresponding portion of the valve body to the bore 27 within the screw-threaded portion 31 of the bore. A plug 35 is threaded into the open screw-threaded end of the channel 32 and closes the channel, and a port 36 leads from the channel at a location adjacent the plug 35 into the bore 27 at a location adjacent the inner end of the screw-threaded end portion 28 of the bore. The channel 32 is counterbored to a larger diameter from the port 36 to the open end of the channel to provide a valve seat at the side of the port 36 remote from the screw plug 35, and a ball valve 37 is disposed in this counterbored portion of the channel and resiliently urged against the valve seat at the inner end of the counterbore by a compression spring 38 disposed between the inner end of the screw plug 35 and the ball 37.

The ball 37 will admit fluid under pressure from the channel 32 into the bore 27 adjacent the end of the bore provided with the screw-threads 28, but will preclude flow of hydraulic fluid from the bore into the channel.

A chamber 40 extends perpendicularly from the channel 32 toward the bore 27 at a location spaced from the side of the port 36 remote from the screw-threads 28 and a port 41 in the form of a narrow slot extending partly circumferentially of the bore 27 connects the end of the chamber 40 adjacent the bore 27 to the latter. The end of the chamber 40 adjacent the port 41 provides a valve seat and the outer end of the chamber is internally screw-threaded and receives a screw plug 42. A ball 43 is disposed in the chamber 40 and is resiliently urged into engagement with the valve seat at the inner end of the chamber by a compression spring 44 disposed in the chamber between the screw plug 42 and the ball 43. The check valve including the ball 43 admits fluid under pressure from the bore 27 to the channel 32 but precludes flow of fluid from the channel 32 to the bore 27 for a purpose which will be later described.

A piston 45 is slidably mounted in the bore 27 in position such that its end nearest the end of the bore having the screw-threaded portion 28 just covers the port 41, and a piston rod 46 extends from the end of the piston remote from the screw-threaded portion 28 toward the screw-threaded portion 29 of the bore 27 substantially coaxially of the bore.

An annular valve guide 47 is threaded into the screw-threaded portion 31 of the bore and is disposed at the end of the screw-threaded portion 31 adjacent the piston 45, and an annular valve seat 48 is threaded into the screw-threaded portion 31 of the bore and spaced from the side of the guide 47 remote from the piston, the piston rod 46 extending slidably through the guide 47 and the valve seat 48. The guide 47 is provided with a counterbore surrounding the piston rod 46 and a packing gland 49 is received in this counterbore and projects from the side of the guide 47 adjacent the valve seat 48. A suitable annular packing 50 is disposed in the guide between the inner end of the counterbore therein and the inner end of the packing gland 49, and a compression spring 51 surrounds the piston rod 46 between the valve seat 48 and the packing gland 49 and resiliently urges the packing gland inwardly of the guide 47 to provide a fluid seal between the guide and the piston rod.

The piston rod 46 is screw-threaded at its end remote from the piston 45, and a conical valve head 52 is mounted on this screw-threaded end portion of the piston rod and maintained in adjusted position thereon by a lock nut 53 also threaded onto the screw-threaded end portion of the piston rod. The valve head 52 is disposed at the side of the valve seat 48 remote from the guide 47 and is brought into closing relationship with a beveled valve head contacting surface 54 in the adjacent end of the valve seat when the piston 45 moves to a predetermined, valve-closing position in the bore 27, as is illustrated in Figure 4, and as will be later described.

A compression spring 55 surrounds the piston rod 46 between the guide 47 and the piston 45 and resiliently urges the piston 45 to its valve-closing position in the bore 27.

The valve body 26 is provided with a closed slot 56 in the wall thereof at a location at the opposite side of the bore from the channel 32, and this slot is surrounded by an external boss formation 57 of cylindrical shape on the outer side of the valve body. The boss 57 is closed at its outer end by a removable closure including a flanged cap 58 preferably formed of a suitable metal, and gasket 59 disposed between the inner side of the cap and the outer end of the boss 57.

A pin 60 is threaded at one end into the piston 45 and projects through the slot 56 and into the boss 57 for manual movement of the piston 45 and valve 52 to open position after the valve has been operated to closed position and the hydraulic system has been subsequently repaired.

The piston 45 is provided with an annular groove near its end remote from the piston rod 46 and a sealing ring 64, preferably in the form of an annular cup of resilient material, is mounted in this groove and engages the inner surface of the bore 27 to provide a fluid seal between the piston and the bore so that fluid cannot pass the piston in a direction to enter the space between the piston and the guide 47. The piston covers the slot 56 at the end of the latter adjacent the screw-thread formation 28 in the bore, and the space between the piston and the guide 47 is vented by a vent aperture 65 in the wall of the bore, so that movement of the piston will not be affected by air or fluid trapped in this space.

In installing the automatic shut-off valve, the end of the bore containing the screw-threads 29 is connected to the end of that portion of the conduit 20 which leads to the cross conduit 18 and the master cylinder 14, and the end of the bore containing the screw-thread formation 28 is connected to the end of that portion of the conduit 20 leading to the flexible coupling 22 and the wheel brake 13, so that in applying fluid under pressure from the master cylinder to the brake, the fluid passes through the shut-off valve from the union element, not illustrated, threaded into the screw-threads 29 to the union element 30 threaded into the screw-threads 28.

In the operation of the device, the novel position of the valve is illustrated in Figure 2, in which the brakes are released and no brake-operating pressure is being generated by the master cylinder 14. In this position, the piston just covers the port 41, and the check valves 37 and 43 are both closed, the fluid trapped in the system between the piston and the associated wheel brake holding the piston in position just covering the port 41 against the force of the spring 55.

If the brake pedal is now depressed, causing the master cylinder 14 to generate fluid pressure on the brake fluid, fluid will flow from the master cylinder and the associated conduits into the end of the bore 27 containing the screw-threads 29, and will flow through the annular valve seat 48, the valve head 52 being at this time spaced from the valve seat, as illustrated in Figure 2, and through the passage 34 into the adjacent end of the channel 32. The fluid under pressure in the channel 32 will displace the ball 37 from the corresponding end of the channel, as indicated in broken lines in Figure 2, and the fluid will then flow past the ball 37 and through the port 36 into the bore 27 at the end of the piston adjacent the screw-threads 28. The pressure of the fluid in the portion of the bore adjacent the screw-threads 28 will tend to force the piston 45 toward the guide 47 uncovering the port 41, but, as the same pressure is being exerted at the side of the ball 43 remote from the port 41, the check valve including the ball 43 will not open under these conditions, and the brake fluid will flow from the bore 27 through the union fitting 30, and the associated conduit portions including the flexible portion 22, to the wheel brake.

When the brake pedal is now released, the brake return springs will force the fluid out of the wheel brake and through the fitting 30 into the adjacent end of the bore 27. The pressure of the fluid in the bore 27 will maintain the piston in position uncovering the port 41 and the return fluid will now flow through this port and past the ball 43 into the channel 32 and from the channel through the passage 34 back into the bore 27 between the guide 47 and the annular valve seat 48 and through the annular valve seat and the adjacent end portion of the bore into the portion of the conduit 20 between the shut-off valve and the master cylinder, returning through these conduit portions to the master cylinder, this operation of the valve being particularly illustrated in Figure 3.

If the brake fluid trapped in the system between the piston 45 and the associated wheel brake is lost by failure of the brake mechanism or the conduit portions between the brake mechanism and the shut-off valve, the spring 55 will force the piston away from the guide 47 to the position illustrated in Figure 4, in which position of the piston the piston rod 46 pulls the valve head 52 into closing engagement with the annular valve seat 48.

Under these conditions no fluid can flow from the master cylinder through the shut-off valve to the brake, and consequently no further fluid will be lost from the system. The master cylinder is still effective to apply pressure to the hydraulic fluid retained in the system to operate the remaining wheel brakes of the vehicle, so that braking effect can be maintained on all of the wheels except the one wheel having the defective brake.

While the improved shut-off valve has been illustrated in the accompanying drawing and hereinabove described in connection with a vehicle hydraulic brake system, it is to be understood that it may be used in any fluid pressure system where its utility is indicated.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

An automatic shutoff valve comprising a body having an elongated bore extending therethrough, a guide carried by said body and extending across said bore to define with the wall of said bore an inlet chamber adjacent one end of the bore and an outlet chamber adjacent the opposite end of said bore, said body having a by-pass passage therein which communicates adjacent one end with the inlet chamber and adjacent its opposite end with the outlet chamber, a check valve carried by the body and operatively connected with the by-pass passage to permit the flow of fluid therethrough from the inlet chamber to the outlet chamber while arresting the flow of fluid from the outlet chamber to the inlet chamber, said body having a fluid return passage therein which communicates with the outlet chamber and with the by-pass passage intermediate the ends thereof, a check valve carried by the body and associated with the fluid return passage to permit the flow of fluid from the outlet chamber to the inlet chamber but arrest the flow of fluid from the inlet chamber to the outlet chamber, a piston mounted in the outlet chamber for movement longitudinally therein across the mouth of the fluid return passage to arrest the flow of fluid from the outlet chamber to the inlet chamber, and yielding means within the bore and engaging the guide and the piston for holding said piston across the mouth of the fluid return passage and for yielding under the pressure of the piston when the pressure of the fluid in the outlet chamber attains a predetermined value to thereby uncover the mouth of the fluid return passage, and a valve in the inlet chamber and operatively connected to the piston for movement thereby to arrest flow of fluid through said inlet chamber when the pressure of the fluid in the outlet chamber falls below a predetermined value.

SAÚL BETANCOURT CANO.
LUIS LARA CORCHERO.

References Cited in the file of this patent

UNITED STATES PATENTS

| Number | Name | Date |
|---|---|---|
| 1,905,077 | Walker | Apr. 25, 1933 |
| 1,922,252 | Martini | Aug. 15, 1933 |
| 2,110,342 | Salvo | Mar. 8, 1938 |
| 2,127,849 | Stone | Aug. 23, 1938 |
| 2,149,295 | Jobson | Mar. 7, 1939 |
| 2,201,523 | Derrig | May 21, 1940 |
| 2,386,585 | Blank | Oct. 9, 1945 |
| 2,534,871 | Lichtman | Dec. 19, 1950 |